(12) United States Patent
Lyadvinsky et al.

(10) Patent No.: US 10,496,848 B1
(45) Date of Patent: Dec. 3, 2019

(54) SYSTEM AND METHOD FOR ACCESSING SECURE FILES

(71) Applicant: Parallels International GmbH, Schaffhausen (CH)

(72) Inventors: Maxim Lyadvinsky, Moscow (RU); Paul Gafa, Valletta (MT); Nikolay Dobrovolskiy, Moscow (RU); Serguei M. Beloussov, Costa del Sol (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 16/201,148

(22) Filed: Nov. 27, 2018

Related U.S. Application Data

(63) Continuation of application No. 15/405,706, filed on Jan. 13, 2017, now Pat. No. 10,181,054.

(51) Int. Cl.
*G06F 21/62* (2013.01)
*G06F 21/60* (2013.01)

(52) U.S. Cl.
CPC ........ *G06F 21/6272* (2013.01); *G06F 21/602* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 4,910,774 A | * | 3/1990 | Barakat | G06Q 20/341 235/380 |
| 5,568,554 A | * | 10/1996 | Eastlake, 3rd | G06F 21/565 380/30 |
| 5,940,507 A | * | 8/1999 | Cane | G06F 21/6245 380/277 |
| 8,095,578 B2 | * | 1/2012 | Nonaka | G06F 21/10 707/703 |
| 8,301,570 B2 | * | 10/2012 | Sathyan | H04L 63/0428 705/51 |
| 8,543,827 B2 | * | 9/2013 | Garcia | G06F 21/6209 713/184 |

(Continued)

OTHER PUBLICATIONS

Mazières et al.; Separating key management from file system security; Published in: Proceeding SOSP '99 Proceedings of the seventeenth ACM symposium on Operating systems principles; pp. 124-139; Charleston, South Carolina, USA—Dec. 12-15, 1999; ACM Digital Library (Year: 1999).*

(Continued)

*Primary Examiner* — Bradley W Holder
(74) *Attorney, Agent, or Firm* — Arent Fox LLP; Michael Fainberg

(57) ABSTRACT

A system and method is provided for accessing secure files by local client devices. An exemplary method comprises receiving an access request to access an encrypted file on a client device, in response to the access request, transmitting a decryption request to decrypt a remote processing portion of a block of the encrypted file, receiving, in response to the decryption request, the decrypted remote processing portion of the block of the encrypted file, and receiving a local decryption key and applying the local decryption key to decrypt one or more local portions of the block of the encrypted file to obtain a fully decrypted block of the encrypted file.

20 Claims, 6 Drawing Sheets

(56) References Cited

U.S. PATENT DOCUMENTS

| | | | | |
|---|---|---|---|---|
| 8,621,036 B1* | 12/2013 | L'Heureux | ............. | G06F 21/62 |
| | | | | 709/217 |
| 8,707,034 B1* | 4/2014 | Ryan | ................... | G06F 21/6218 |
| | | | | 707/784 |
| 2002/0191796 A1* | 12/2002 | Muschenborn | ....... | H04L 9/0662 |
| | | | | 380/277 |
| 2013/0219176 A1* | 8/2013 | Akella | ................ | H04L 63/0815 |
| | | | | 713/165 |
| 2014/0281571 A1* | 9/2014 | Federspiel | .......... | G06F 21/6209 |
| | | | | 713/189 |
| 2016/0065571 A1* | 3/2016 | Hoyos | ................ | H04L 63/0861 |
| | | | | 713/168 |
| 2017/0155628 A1* | 6/2017 | Rohloff | ..................... | H04L 9/30 |

OTHER PUBLICATIONS

Hughes et al.; Architecture of the Secure File System; Published in: 2001 Eighteenth IEEE Symposium on Mass Storage Systems and Technologies; Date of Conference: Apr. 17-20, 2001; IEEE Xplore (Year: 2001).*

* cited by examiner

SYSTEM AND METHOD FOR ACCESSING SECURE FILES

CROSS REFERENCE TO RELATED APPLICATIONS

The present application is a continuation of U.S. patent application Ser. No. 15/405,706, filed Jan. 13, 2017, the entire contents of which is incorporated herein by reference.

TECHNICAL FIELD

The present disclosure generally relates to the field of document and file management, and, more particularly, to a system and method for secure file and document management and editing by local client devices.

BACKGROUND

In conventional networks using remote servers (e.g., corporate business networks), documents and other files stored on remote servers can be edited by a client device, for example using a remote desktop access application. For example, existing remote access software, such as Parallels Remote Access Server, provide users with the ability to edit locally stored documents by a remote application, running on a terminal server, for example.

More recently, many companies have begun to employ a "bring your own device" or "BYOD" policy in which companies are providing access to corporate applications from users devices. Since the corporate documents and files may appear on users devices, there are also software solutions to protect these documents from unauthorized access in case an employee leaves the company, loses his or her device, or the like. For example, existing methods either maintain the documents on the user's devices in an encrypted form by a user's key or store the documents only on corporate servers/PCs and prevent the documents from being stored locally on the user's device.

However, there are significant drawbacks to both types of existing systems. For example, if a corporate file is stored on a user's device in encrypted form, the user can have access to this file even if he or she is dismissed from the company since the decryption key is stored locally on the computer. On the other hand, maintaining all files only on corporate servers does not give a user flexibility to use the computing power of his or her own devices. Moreover, when the corporate servers are managing thousands or even millions of documents that need to be accessed by users, the corporate servers must employ a high bandwidth connection so that these users can access the files stored on the remote servers.

SUMMARY

Thus, the present disclosure provides for a system and method for accessing secure files by local client devices. More particularly, the disclosed system and method enables users to keep files on the user's devices, but these files are encrypted by a server key that is not accessible to the user. As a result, the system and method provides the flexibility for users to have a local copy of the corporate documents, while at the same time this local copy is encrypted by the server key to ensure that the local copy is inaccessible by the device if the device is stolen/lost or if the user is dismissed from the company (i.e., disconnected from the remote server).

Thus, in one aspect, an exemplary method is provided for secure file access by a client device. In this aspect, the method comprises receiving an access request to access an encrypted file on a client device, in response to the access request, transmitting a decryption request to decrypt a remote processing portion of a block of the encrypted file, receiving, in response to the decryption request, the decrypted remote processing portion of the block of the encrypted file, and receiving a local decryption key and applying the local decryption key to decrypt one or more local portions of the block of the encrypted file to obtain a fully decrypted block of the encrypted file.

In another aspect, the method further comprises transmitting a decryption request for each encrypted block of the encrypted file and receiving a local decryption key for each encrypted local portion of the encrypted file.

In another aspect, the method further comprises writing the decrypted remote processing portion of the block in place of the remote processing portion of the block on the client device.

In another aspect, the method further comprises receiving a save request for saving a new file for the first time on the client device and in response to the save request, transmitting an encryption request to encrypt a remote processing portion of a block of the new file.

In another aspect, the method further comprises receiving, in response to the encryption request, the encrypted remote processing portion of the block of the new file, and receiving a local encryption key, identifying a new memory address in a disk of the client device and saving the encrypted remote processing portion of the block to the new memory address on the disk and applying the local encryption key to the one or more local portions of the block of the new file to obtain a fully encrypted block of the new file.

In another aspect, the local encryption key is generated by a symmetric encryption algorithm.

In another aspect, the symmetric encryption algorithm is one of Twofish, Serpent, AES (Rijndael), Blowfish, CASTS, RC4, 3DES, Skipjack, Safer+/++(Bluetooth), IDEA, or GOST.

In one further aspect a system is provided for secure file access by a client device. In this aspect, the system comprises a hardware processor configured to receive an access request to access an encrypted file on a client device, in response to the access request, transmit a decryption request to decrypt a remote processing portion of a block of the encrypted file, receive, in response to the decryption request, the decrypted remote processing portion of the block of the encrypted file, and receiving a local decryption key and apply the local decryption key to decrypt one or more local portions of the block of the encrypted file to obtain a fully decrypted block of the encrypted file.

In another aspect, a non-transitory computer readable medium is provided that includes computer executable instructions for secure file access by a client device, as described in the methods above.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
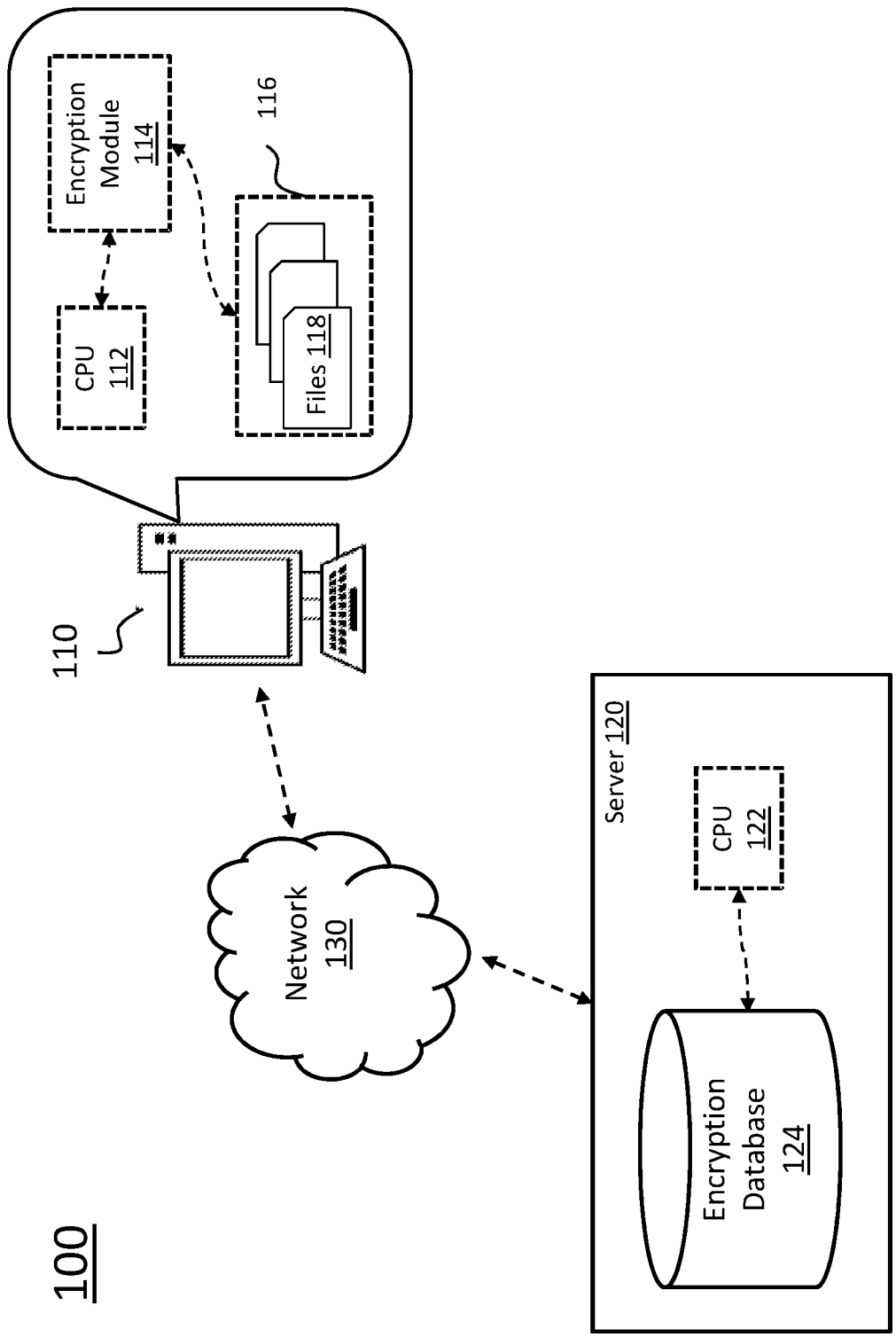
FIG. 1 illustrates a high-level block diagram of a system for secure file and document management and editing by local client devices according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 1 illustrates a high-level block diagram of a system for secure file and document management and editing by local client devices according to an exemplary aspect. As shown, system 100 includes a client device 110 (e.g., a personal computer device), a remote server 120, and a network 130. According to an exemplary aspect, it is contemplated that system 100 comprises a corporate network infrastructure in which one or more client devices (e.g., client device 110) communicate data to and from remote server 120 via network 130. For sake of simplicity, only one client device 110 is shown, but it is contemplated that the system 100 can be provided for multiple client devices.

Moreover, according to the exemplary aspect, network 130 can be any network for communicating data and data operations and can include a communication system (not shown) that connects the various computers of the system by wire, cable, fiber optic, and/or wireless links facilitated by various types of well-known network elements, such as hubs, switches, routers, and the like. For example, network 130 may employ various well-known protocols to communicate information amongst the network resources. In one aspect, the network 130 can be part of the Internet or intranet using various communications infrastructure such as Ethernet, WiFi and the like. In a refinement of this aspect, the network 130 can be, for example, a virtual private network that extends a corporate private network across a public network, such as the Internet.

In general, the client device 110 can be a personal computer, laptop, desktop, smartphone, tablet, or the client that is communicatively coupled to network 130 and/or directly to server 120. Although an example of the hardware components is described below with respect to FIG. 5, the client device 110 generally a central processing unit ("CPU") 112 that is configured to execute computing operations, including execution of encryption module 114. As will be described in more detail below, encryption module 114 is configured to generate and maintain an encrypted disk 116 that stores and manages a plurality of encrypted files 118 that each include one or a plurality of data blocks. In one aspect, the contents of files 118 are encrypted by a symmetric encryption algorithm as disclosed herein. Moreover, it should be appreciated that the encrypted disk 116 is generally the memory of the computer that include both encrypted files 118 and other files, or the like. In yet another exemplary aspect, a mounted virtual disk can be added to client device 110 where all of the contents of the virtual disk file image can be encrypted using the same algorithms and processes used to encrypt files 118 as described in detail herein. Furthermore, in one aspect, the encrypted disk 118 of client device 110 can be for a whole hard disk volume of client device 110 or actually the entire hard disk of client device 110. In this aspect, the encryption process works on the block level of the physical hard disk, meaning that each data block can be encrypted according to the exemplary algorithms described herein, for example.

Moreover, according to the exemplary aspect, client device 110 includes an operating system with document editing software applications (e.g., Microsoft Office®, Adobe Acrobat Professional®, and the like) configured to create, manage, edit, delete, etc., computer files, such as files 118. Moreover, in the exemplary aspect when system 100 forms a corporate network, the client device 110 can be associated with a user, who may be an employee, consultant, etc., of the corporation that maintains remote server 120. In other words, remote server 120 maintains ownership and control over files 118. In general, it should be understood that the system and method disclosed herein can be implemented for any type of computing device provided to locally store files where a remote server ultimately desires to maintain control of the documents and immediately prevent a user of client device 110 from locally accessing such files 118. The advantages of this system will become apparent from the follow description.

As further shown in FIG. 1, remote server 120 includes a CPU 122 and an encryption database 124 configured to store one or a plurality of encryption and decryption keys for data stored locally on client device 110 (e.g., files 118). Although not shown in detail, remote server 120 includes electronic memory that stores executable code that is executed by the CPU 120 to execute one or a plurality of modules configured to perform the algorithms disclosed herein, as will be described in more detail with regard to FIG. 3.

Each of these modules can be considered a single collective module or separate software modules, with the modules each including software code (e.g., processor executable instructions) in the memory of the remote server 120. In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 2:
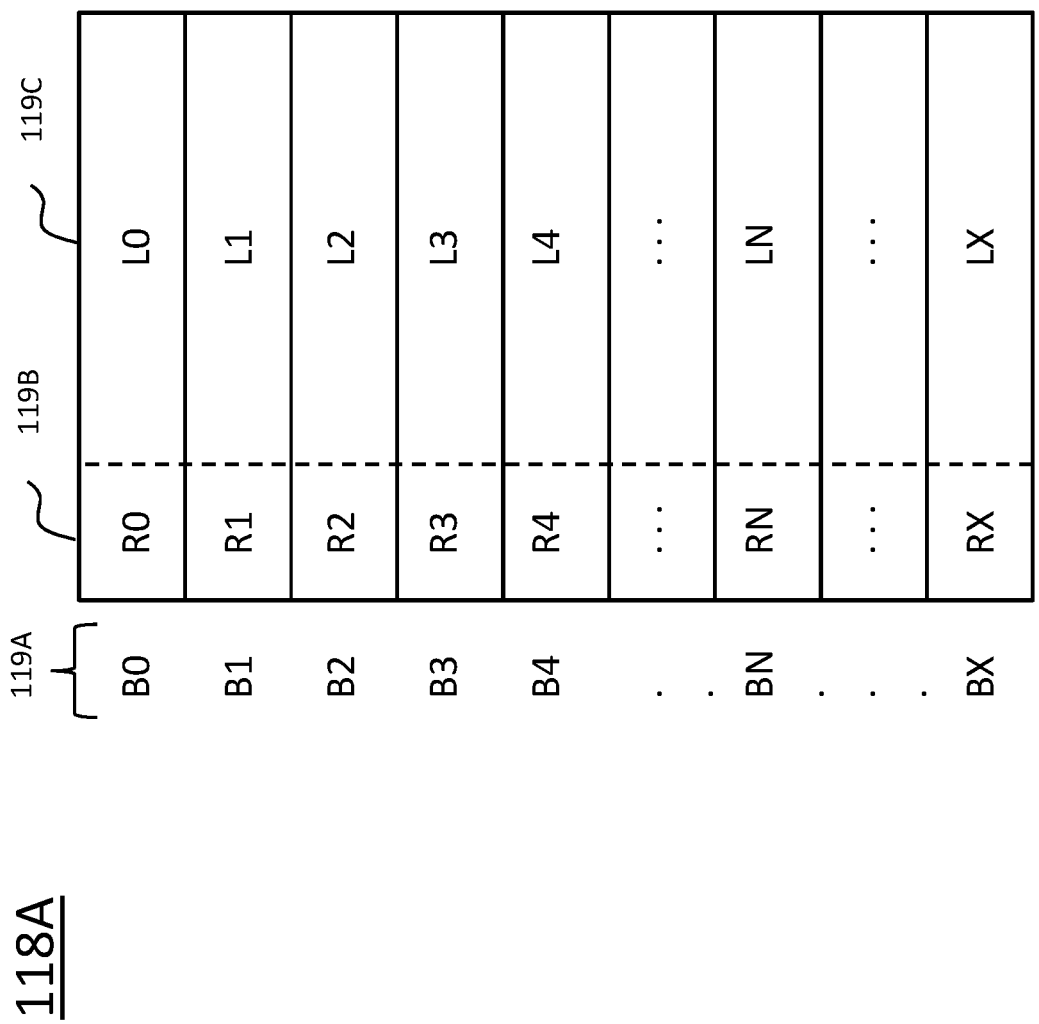
FIG. 2 illustrates a block diagram of a file stored on client device of the exemplary system shown in FIG. 1 according to an exemplary aspect.

FIG. 2 illustrates a block diagram of a file stored on client device 110 of the exemplary system shown in FIG. 1 according to an exemplary aspect. As noted above, the client device 110 is configured to create an encrypted disk 116 on its local memory. More particularly, using encryption module 114, the CPU 112 is configured to store data content in memory that is split into pairs of blocks as shown. FIG. 2 illustrates a single file 118A that comprises a plurality of data blocks. However, it should be appreciated that the data blocks can form a plurality of files, etc.

In any event, file 118A can be stored as X total blocks, which are shown as B0 ... BX data blocks. Thus, each block is provided with block numbers or identifiers 119A, such that the first block is identified as B0, the second is identified as B1, and so forth until the last bock is identified as BX. Moreover, each block is divided into a pair of sub-blocks or parts 119B and 119C. Thus, as shown, block B0 has a first block portion R0 and a second block portion L0. Similarly, block B1 has a first block portion R1 and a second block portion L1, and so forth.

According to the exemplary aspect, each of the first block portions 119B are provided for remote processing by remote server 120. Moreover, each of the second block portions 119C are provided for local processing by client device 110. Preferably, the first block portions 119B are much smaller than the second block portions 119C, since such an arrangement will maximize local processing by client device 110 and minimize load on the network 130 to transmit data to and from remote server 120 and client devices, such as client device 110. Thus, in one aspect, if each block B0 ... BX is 64 MB, then the encryption module 114 is configured to divide each block to first block portions 119B (i.e., remote processing blocks) that can be 64 KB, for example, and second block portions 119C (i.e., local processing blocks) that can be 64 MB-64 KB, for example. In this regard, the remote processing blocks 119B (which are much smaller relative to blocks 119C) are encrypted by remote server 120 while the local processing blocks 119C (which are preferably much larger relative to blocks 119B) are encrypted by the encryption module 114.

Figure 3:
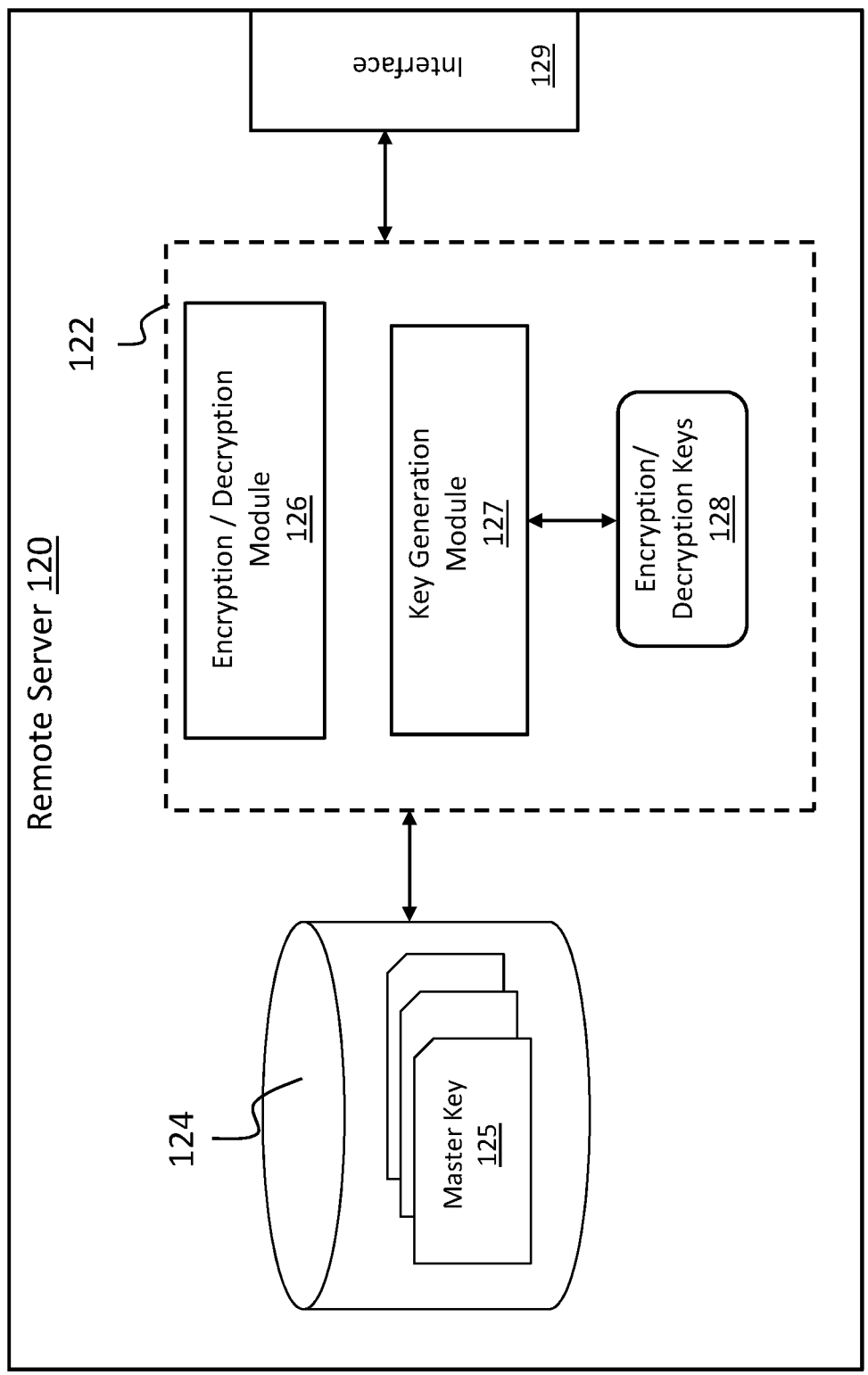
FIG. 3 illustrates a block diagram of the remote server of system 100 according to an exemplary aspect.

FIG. 3 illustrates a block diagram of the remote server 120 of system 100 according to an exemplary aspect. As shown, the remote server 120 includes a network interface 129 configured to receive data from network 120, including remote processing blocks 119B transmitted from client device 110. Furthermore, the remote server 120 includes CPU 122 that is configured to execute a number of software modules including encryption/decryption module 126 and key generation module 127.

According to the exemplary aspect, the remote server 120 includes an encryption database 124 that is electronic memory configured to store one master encryption key 125 or a plurality of master encryption keys. In this aspect, the master encryption key(s) 125 are always stored on the server side and never transmitted to the client device(s) 110. During operation, the client device 110 is configured to transmit the block identifier (e.g., block "N"), which can be an identification number associated with the block, and remote processing block (e.g., remote processing block "RN") to server 120. According to one exemplary aspect, this encryption request may be performed by client device 110 each time client device 110 executes a save command of file 118A that includes block N. According to another exemplary aspect, the encryption request is performed on a periodic basis by client device 110. It should be appreciate that encryption module 114 may be a software module provided by the enterprise managing the corporate network, and, more particularly, remote server 120. Thus, server 120 can effectively manage the encryption and decryption of data blocks stored locally on client device 110 (i.e., second block portions 119C) based on the algorithms executed by encryption module 114.

Upon receiving the remote processing block "RN", encryption/decryption module 126 of server 120 is configured to encrypt the remote processing block "RN" using master encryption key 125. According to an exemplary aspect, encryption algorithm implemented by the disclosed system and method can be any of symmetric encryption algorithms, such as, for example, Twofish, Serpent, AES (Rijndael), Blowfish, CAST5, RC4, 3DES, Skipjack, Safer+/++(Bluetooth), IDEA, GOST, and the like. Moreover, the system and method can use any TCP-based protocols, such as REST-based protocol or the like.

Upon encryption by server 120, the encrypted remote processing block "RN" is then returned to client device 110 and stored in encrypted disk 116. In one aspect, it is contemplated that updated encrypted blocks replace existing blocks in encrypted disk 116. In another aspect, if the file is being saved for the first time, a new memory address in encrypted disk 116 is identified and used for storing encrypted remote processing block "RN".

It is noted that in one aspect, a single master key 125 can be used encryption for all remote processing blocks of all client devices in communication with remote server 120. In another aspect, a separate master key can be generated for each client device in the network.

In addition, using key generation module 127, the remote server is also configured to generate an encryption key KN (e.g., encryption/decryption keys 128) for block N. For example, in this aspect, the key generation module 127 generates the local encryption key KN using the block number (identifier) N and the master key 125. In a related aspect, the key generation module 127 generates the local encryption key KN as an encrypted hash value of number N, for example. It is contemplated that other cryptology algorithms using stream ciphers, block ciphers, and the like can be used to for this encryption process.

According to the exemplary aspect, remote server 120 is then configured to transmit the local encryption key KN to client device 110, where encryption module 114 is configured to encrypt local processing block "LN" using the local encryption key KN. Encryption algorithms and protocols that can be implemented by remote server 120 are discussed above as possible aspects of the system. Based on the local encryption performed by client device 110, file 118A stored in encrypted disk 116 will now include an encrypted block BN that includes remote processing block RN that is encrypted by master key 125 and local processing block LN that is encrypted by local encryption key KN. Thus, the majority of the data in block BN (i.e., local processing block LN) does not need to be transmitted to remote server 120 for encryption. At the same time, by encrypting remote processing block RN by master encryption key 125, the remote server 120 maintains access control over data block BN. Accordingly, if a user of client device 110 attempts to access file 118A and/or block BN, the client device can only access this data block by decrypting remote processing block RN using the master encryption key 125, which is controlled and maintained by remote server 120.

According to the exemplary aspect, in order to open a file 118A, the client device 110 must access each data block associated with the file (e.g., block BN) and transmit the block identifier BN and remote processing block RN to the remote server 120. Upon receipt, the encryption/decryption module 126 decrypts the remote processing block RN using the master key 125 and returns the decrypted data block to client device 110. In addition, the remote server generates a decryption key KN using the same algorithm described above for the encryption key for local processing block LN. In another aspect, the decryption key could have been previously created and stored in encryption database 124. In either event the decryption key KN is returned to client device 110 that in turn decrypts the local processing block LN using the decryption key received from remote server 120. As a result, the client device 110 has decrypted both remote processing block RN and local processing block LN, and, therefore, can access block N for file 118A to enable processing, editing, and the like by a user of client device 110.

Advantageously, by encrypting remote processing block RN using master key 125 that is maintained only on remote server 120, the client device 110 cannot access block N if it is disconnected from remote server 120. Thus, for example, if client device 110 is a user's personal computer, the enterprise can still allow the user to employ his or her personal computing device for document editing, etc., but still maintain control and access over the files. Thus, if the individual leaves or is terminated from the business/enterprise (i.e., data communication with the remote server 120 is terminated), then the individual cannot access data block N even though this data block may still be locally stored in the electronic memory of his or her computer, i.e., encrypted disk 116.

Figure 4A:
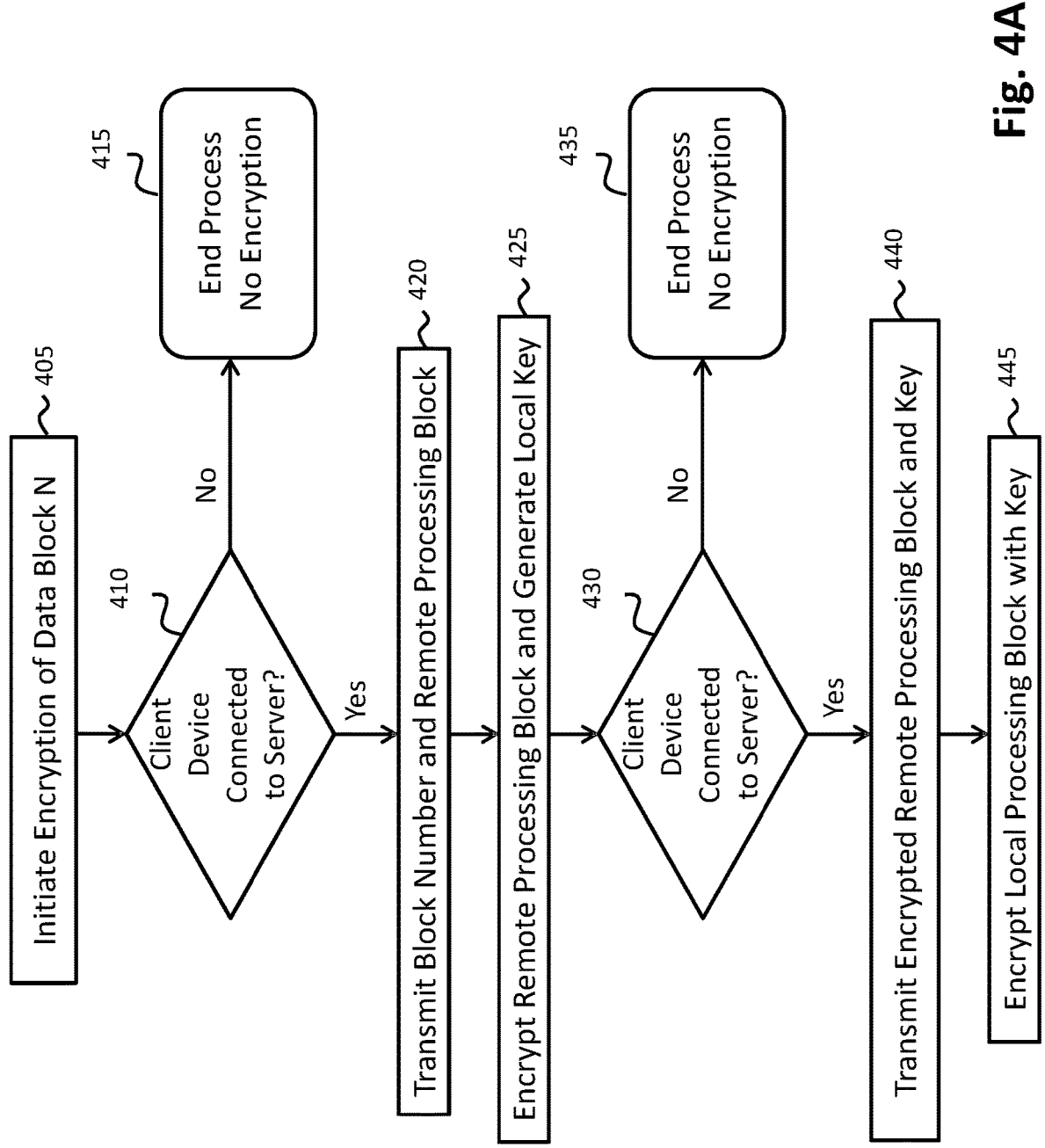
FIGS. 4A and 4B illustrate flowcharts for a method for secure file and document management and editing by local client devices according to an exemplary aspect.
Figure 4B:
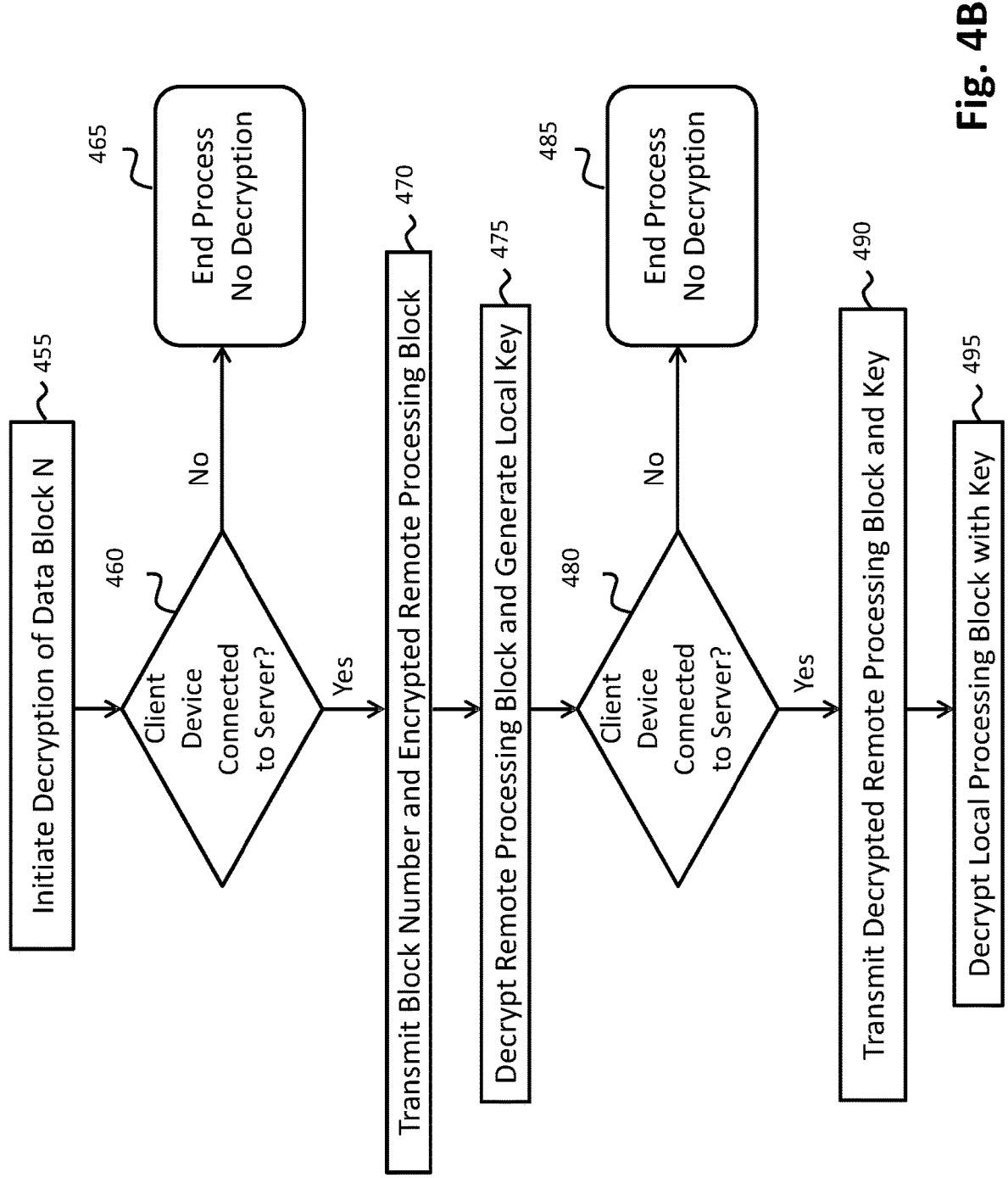

FIGS. 4A and 4B illustrate flowcharts for a method for secure file and document management and editing by local client devices according to an exemplary aspect. It should be appreciated that the following description of the disclosed process refers to the exemplary components discussed above.

In particular, FIG. 4A illustrates a method for the encryption process of a data block as described above. Initially, at step 405, an encryption process is initiated by client device 110. For example, the encryption request can be in response to an attempt to save file 118A including data block N by client device 110. In this aspect, each file on client device 110 may include metadata that identifies the file as required the encryption by remote server 120. These files can be considered being part of or within a secured or encrypted box. Thus, the encryption process starts at step 405 each time user changes a file 118A within the secured box (or encrypted box). In one aspect, the encrypted box can represent a folder, where all the files (e.g., files 118) are encrypted/decrypted automatically using the exemplary algorithms described herein. In another aspect, the encrypted box can be a mounted virtual disk, where all contents of the virtual disk file image are encrypted using the algorithms described herein. In yet another aspect, the encrypted box can represent a whole hard disk volume or the whole hard disk. In this case encryption works on the block level of the physical hard disk.

Moreover, while step 405 is initiated at client device 110 in the exemplary aspect, in an alternative aspect, the encryption process can be initiated by remote server 120. For example, the encryption can be initiated as a pulling function of remote server 120 whereby remote server 120 sends a request to encrypt a particular data block or file on client device 110. In yet another aspect, the encryption process is performed periodically for all data blocks that have been changed (e.g., written to) by CPU 112 of client device 110. Moreover, if the client device 110 is currently offline (i.e., not connected to remote server 120), the file 118A can be saved and logged for encryption. Then, when client device 110 detects a connection with remote server 120, the encryption process is initiated.

In any event, next at step 410, the client device 110 will attempt to connect (or will identify a current connection) with remote server 120 over network 130, for example. If there is no connection at step 410, the method proceeds to step 415 where the process ends and no encryption of data block N is performed. Otherwise, the method proceeds to step 420 where client device 110 transmits the block number or identifier N and the remote processing block RN to remote server 120. Upon receipt, at step 425 the remote server 120 encrypts the remote processing block RN using a master encryption key (e.g., key 125) and generates a local encryption key based on the block identifier N (e.g., a hash value of number N).

Again, at step 430 (optional) the remote server 120 determines whether a connection exists with client device 110. If there is no connection at step 430, the method proceeds to step 435 where the process ends and the encrypted of remote processing block RN will not be transmitted. However, upon detecting a connection, the remote server 120 will transmits the encrypted remote processing block RN and the local encryption key to client device 110 at step 440, which will both be stored in the local memory of client device 110. Finally, at step 445, the local encryption module 114 of the client device 110 will encrypt the local processing block LN of block N using the received local encryption key generated by remote server 120. As a result, the encrypted disk 116 of the client device 110 will include an encrypted data block N that includes of an encrypted remote processing block RN (encrypted by the master key of server 120) and an encrypted local processing block LN (encrypted by the received local encryption key).

Moreover, FIG. 4B illustrates a method for the decryption process of the encrypted data block described above and mirrors the encryption process shown in FIG. 4A. In particular, initially, at step 455, a decryption process is initiated by client device 110. For example, the decryption request can be in response to an attempt to open/access/write to a file 118A that includes the encrypted data block N by client device 110. Next, at step 460, the client device 110 will attempt to connect (or will identify a current connection) with remote server 120 over network 130, for example. If there is no connection at step 460, the method proceeds to step 465 where the process ends and no decryption of data block N is performed. Advantageously, this means that the remote server 120 can intentionally disconnect with client device 110 and thereby prevent client device 110 from opening, editing or otherwise accessing the encrypted data block N.

If a connection exists, the method proceeds to step 470 where client device 110 transmits the block number or identifier N and the encrypted remote processing block RN to remote server 120. Upon receipt, at step 475 the remote server 120 decrypts the remote processing block RN using the same master encryption key (e.g., key 125) used previously for encryption. Moreover, a local decryption key is generated as described above based on the block identifier N (e.g., a hash value of number N). At this point, at step 480 the remote server 120 can then (optionally) determine whether a connection exists with client device 110. If there is no connection at step 480 (e.g., if the administrator has removed the connection with client device 110), the method proceeds to step 485 where the process ends and the decrypted remote processing block RN will not be transmitted to client device 110. In a refinement of this aspect, the server 120 can refer to a list of approved and current list of devices (e.g., client devices) that are permissibly connected to the server 120. For example, the business operating the server 120 can store in memory of the server a current list of employees and associated devices that are approved, by an administrator, for example, of being connected to the remote server 120. Thus, only if the client device requesting the decrypted remote processing block RN is on this list will the server be permitted to transmit the decrypted data to the client device 110.

Upon detecting a connection (and if the client device 110 is approved), the remote server 120 will transmits the decrypted remote processing block RN and the local decryption key to client device 110 at step 490, which will both be stored in the local memory of client device 110. Finally, at step 495, the local encryption module 114 of the client device 110 will decrypt the local processing block LN of block N using the received local decryption key generated by remote server 120. As a result, the client device 110 can access data block N that includes remote processing block RN (decrypted by server 120) and local processing block LN (decrypted by the received local decryption key).

Thus, according to the exemplary aspect, at least a portion of each data block locally stored on a client device is encrypted by a master key maintained on a remote server. This prevents the situation where all portions of the data block are processed (i.e., encrypted and/or decrypted) locally in which case the client device could cache all the keys generated by the server locally, thereby eliminated the need for the server connection. Moreover, in conventional cases where all data is processed remotely by the server, such systems lose the benefit from the local processing power and also significantly increase the load on the bandwidth of the corporate network. The system and method disclosed herein maximizes use of local processing power by client devices, minimizes bandwidth load on the corporate network, and maintains security of files and data by remote server 120.

Preferably, according to the exemplary aspect, the ratio between remote processing blocks and local processing blocks is substantially less than one, i.e., the remote processing block is only a fraction of the size of the local processing block. However, it should be appreciated that the size of the remote processing block must still be large enough to make caching of server keys by the client device useless. For example, if the client device 110 is editing a PowerPoint presentation that is 5 MB, the remote server 120 may control the system such that the remote processing blocks are approximately 5% or even less of the file, as long as this remote processing blocks must be decrypted in order for the client device to open the document. As a result, if the remote server 120 is not available as described above, then the PowerPoint presentation cannot be opened, even if 95% of this document can be potentially decrypted locally by the client device, assuming that the local encryption keys were cached by the client device 110. In one aspect, the ratio between remote processing blocks and local processing blocks is defined by the encryption module 114, although, as noted above, the encryption module 114 can be remoted controlled by server 120.

Figure 5:
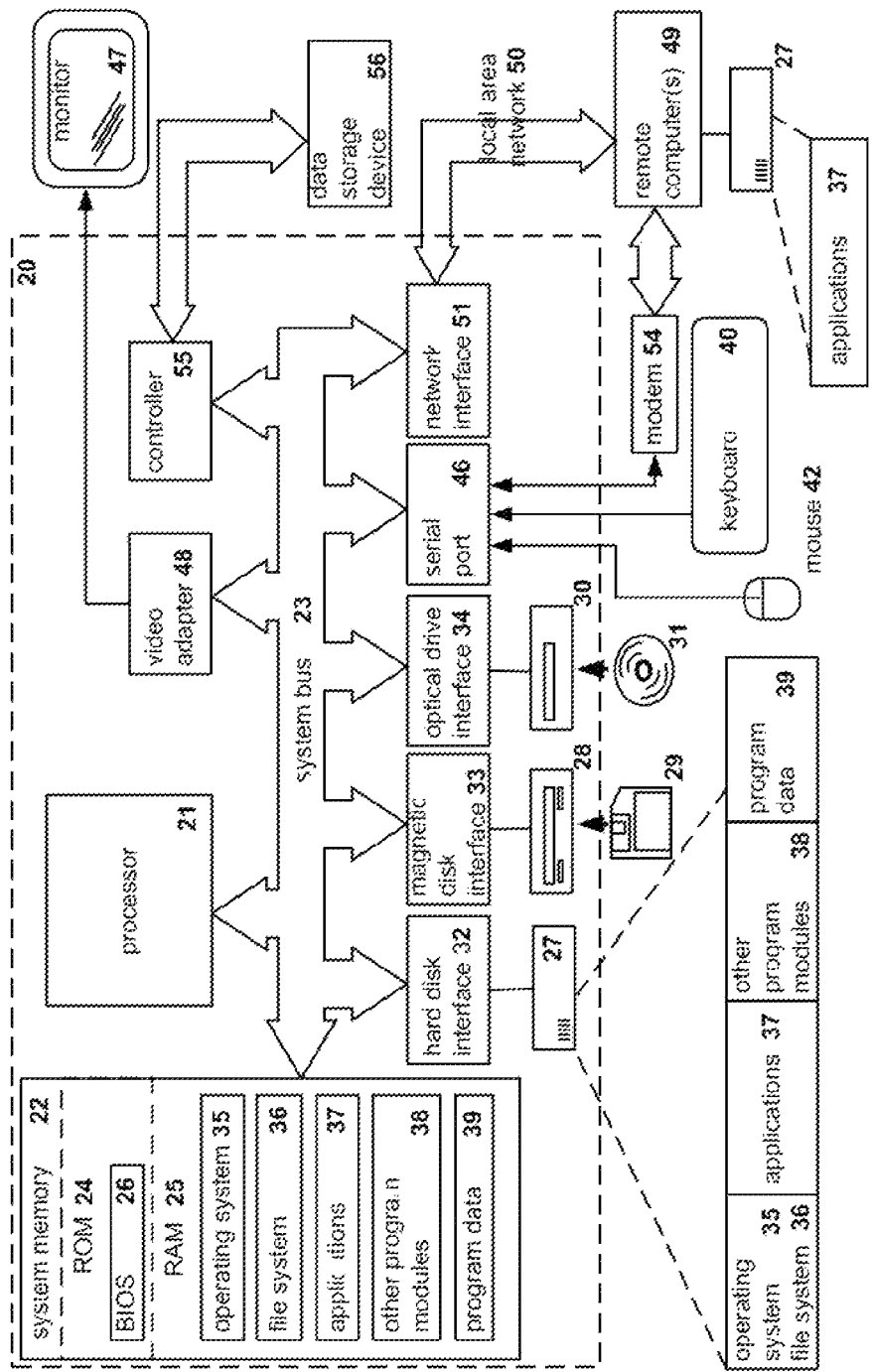
FIG. 5 illustrates an example of a general-purpose computer system (which may be a personal computer or a server) on which the disclosed systems and method can be implemented according to an example aspect.

FIG. 5 illustrates an example of a general-purpose computer system (which may be a personal computer or a server) on which the disclosed systems and method can be implemented according to an example aspect. It should be appreciated that the detailed general-purpose computer system can correspond to client device 110 and/or server 120 configured to execute the above-described algorithms according to an exemplary aspect.

As shown, the computer system 20 includes a central processing unit 21, a system memory 22 and a system bus 23 connecting the various system components, including the memory associated with the central processing unit 21. For example, the central processing unit 21 can correspond to the CPU 112 of client device or CPU 122 of server 120, as described above. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides an exemplary implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for secure file access comprising:
   receiving, by a client device, an access request to access an encrypted file on the client device;
   in response to the access request, transmitting, to a server, a decryption request to decrypt a remote processing portion of a block of the encrypted file;
   receiving, by the client device, in response to the decryption request, the decrypted remote processing portion of the block of the encrypted file, and receiving a local decryption key; and
   applying, by the client device, the local decryption key to decrypt one or more local portions of the block of the encrypted file to obtain a fully decrypted block of the encrypted file.

2. The method of claim 1, further comprising:
   transmitting a decryption request for each encrypted block of the encrypted file; and
   receiving a local decryption key for each encrypted local portion of the encrypted file.

3. The method of claim 1, further comprising:
   writing the decrypted remote processing portion of the block in place of the remote processing portion of the block on the client device.

4. The method of claim 1, further comprising:
   receiving a save request for saving a new file for the first time on the client device; and
   in response to the save request, transmitting an encryption request to encrypt a remote processing portion of a block of the new file.

5. The method of claim 4, further comprising
   receiving, in response to the encryption request, the encrypted remote processing portion of the block of the new file, and receiving a local encryption key;
   identifying a new memory address in a disk of the client device and saving the encrypted remote processing portion of the block to the new memory address on the disk; and
   applying the local encryption key to the one or more local portions of the block of the new file to obtain a fully encrypted block of the new file.

6. The method of claim 5, wherein the local encryption key is generated by a symmetric encryption algorithm.

7. The method of claim 6, wherein the symmetric encryption algorithm is one of Twofish, Serpent, AES (Rijndael), Blowfish, CASTS, RC4, 3DES, Skipjack, Safer+/++(Bluetooth), IDEA, or GOST.

8. A system for secure file access comprising:
   a hardware processor configured to:
   receive, by a client device, an access request to access an encrypted file on the client device;
   in response to the access request, transmit, to a server, a decryption request to decrypt a remote processing portion of a block of the encrypted file;
   receive, by the client device, in response to the decryption request, the decrypted remote processing portion of the block of the encrypted file, and receiving a local decryption key; and
   apply, by the client device, the local decryption key to decrypt one or more local portions of the block of the encrypted file to obtain a fully decrypted block of the encrypted file.

9. The system of claim 8, wherein the hardware processor is further configured to:
- transmit a decryption request for each encrypted block of the encrypted file; and
- receive a local decryption key for each encrypted local portion of the encrypted file.

10. The system of claim 8, wherein the hardware processor is further configured to:
- write the decrypted remote processing portion of the block in place of the remote processing portion of the block on the client device.

11. The system of claim 8, wherein the hardware processor is further configured to:
- receive a save request for saving a new file for the first time on the client device; and
- in response to the save request, transmit an encryption request to encrypt a remote processing portion of a block of the new file.

12. The system of claim 11, wherein the hardware processor is further configured to:
- receive, in response to the encryption request, the encrypted remote processing portion of the block of the new file, and receiving a local encryption key;
- identify a new memory address in a disk of the client device and saving the encrypted remote processing portion of the block to the new memory address on the disk; and
- apply the local encryption key to the one or more local portions of the block of the new file to obtain a fully encrypted block of the new file.

13. The system of claim 12, wherein the local encryption key is generated by a symmetric encryption algorithm.

14. The system of claim 13, wherein the symmetric encryption algorithm is one of Twofish, Serpent, AES (Rijndael), Blowfish, CASTS, RC4, 3DES, Skipjack, Safer+/++ (Bluetooth), IDEA, or GOST.

15. A non-transitory computer-readable medium, storing instructions thereon for secure the access, the instructions comprising:
- receiving, by a client device, an access request to access an encrypted the on the client device;
- in response to the access request, transmitting, to a server, a decryption request to decrypt a remote processing portion of a block of the encrypted file;
- receiving, by the client device, in response to the decryption request, the decrypted remote processing portion of the block of the encrypted file, and receiving a local decryption key; and
- applying, by the client device, the local decryption key to decrypt one or more local portions of the block of the encrypted file to obtain a fully decrypted block of the encrypted file.

16. The medium of claim 15, wherein the instructions further comprise:
- transmitting a decryption request for each encrypted block of the encrypted file; and
- receiving a local decryption key for each encrypted local portion of the encrypted file.

17. The medium of claim 15, wherein the instructions further comprise:
- writing the decrypted remote processing portion of the block in place of the remote processing portion of the block on the client device.

18. The medium of claim 15, wherein the instructions further comprise:
- receiving a save request for saving a new file for the first time on the client device; and
- in response to the save request, transmitting an encryption request to encrypt a remote processing portion of a block of the new file.

19. The medium of claim 18, wherein the instructions further comprise:
- receiving, in response to the encryption request, the encrypted remote processing portion of the block of the new file, and receiving a local encryption key;
- identifying a new memory address in a disk of the client device and saving the encrypted remote processing portion of the block to the new memory address on the disk; and
- applying the local encryption key to the one or more local portions of the block of the new file to obtain a fully encrypted block of the new file.

20. The medium of claim 19, wherein the local encryption key is generated by a symmetric encryption algorithm.

* * * * *